(12) United States Patent
Todd et al.

(10) Patent No.: US 11,044,308 B2
(45) Date of Patent: Jun. 22, 2021

(54) DYNAMIC GATEWAY COMMUNICATION PROTOCOL CONTROL VIA SOFTWARE DEFINED RADIO IMPLEMENTED DEVICES

(71) Applicant: EMC IP Holding Company LLC, Hopkinton, MA (US)

(72) Inventors: Stephen J. Todd, Center Conway, NH (US); Jason A. Shepherd, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/397,758

(22) Filed: Apr. 29, 2019

(65) Prior Publication Data

US 2020/0344292 A1   Oct. 29, 2020

(51) Int. Cl.
*H04L 29/08*  (2006.01)
*G06F 16/23*  (2019.01)
*H04L 29/06*  (2006.01)
*G06Q 20/16*  (2012.01)

(52) U.S. Cl.
CPC ...... *H04L 67/1065* (2013.01); *G06F 16/2379* (2019.01); *H04L 67/1078* (2013.01); *H04L 69/08* (2013.01); *H04L 69/18* (2013.01); *G06Q 20/16* (2013.01)

(58) Field of Classification Search
CPC . H04L 69/18; H04L 67/1065; H04L 67/1078; H04L 69/08; H04L 47/70; H04L 43/0882; H04L 47/2441; H04L 47/10; G06Q 20/16; G06F 16/2379
USPC ........................................................ 709/226
See application file for complete search history.

(56) References Cited

U.S. PATENT DOCUMENTS

| 10,616,324 | B1* | 4/2020 | Kaddoura | ............... H04L 43/04 |
| 2004/0146038 | A1* | 7/2004 | Dale | .................. H04B 7/18513 370/348 |
| 2008/0310302 | A1* | 12/2008 | Detwiler | ............. H04L 67/1002 370/230 |
| 2012/0178452 | A1* | 7/2012 | Reagan | ................. H04W 36/24 455/436 |

(Continued)

OTHER PUBLICATIONS

Thesaurus.com (Year: 2014).*

(Continued)

*Primary Examiner* — Tan Doan
(74) *Attorney, Agent, or Firm* — Ryan, Mason & Lewis, LLP

(57) ABSTRACT

Techniques are provided for dynamic communication protocol control in a communication environment. For example, a request is sent by a given processing node of a plurality of processing nodes to a computing system. Each of the plurality of processing nodes is operatively coupled to the computing system. Each of at least a subset of the plurality of processing nodes is configured to communicate via at least a first communication protocol with which each of the subset of the plurality of processing nodes share bandwidth. The request seeks usage of a given amount of additional bandwidth associated with the first communication protocol by the given processing node from one or more of the subset of processing nodes. One or more of the subset of processing nodes can then decide to cede the additional bandwidth to the given processing node and convert to using another communication protocol.

20 Claims, 8 Drawing Sheets

(56) References Cited

U.S. PATENT DOCUMENTS

| | | | | |
|---|---|---|---|---|
| 2013/0272117 A1* | 10/2013 | Bagasra | .................... | H04J 3/22 |
| | | | | 370/229 |
| 2016/0094318 A1* | 3/2016 | Shattil | ................... | H04J 13/004 |
| | | | | 375/267 |
| 2016/0100437 A1* | 4/2016 | Armstrong | ......... | G05B 19/4185 |
| | | | | 370/249 |
| 2017/0126578 A1* | 5/2017 | Amulothu | ............... | H04L 47/70 |
| 2018/0278728 A1* | 9/2018 | Kongovi | ................. | H04L 69/24 |
| 2018/0316518 A1* | 11/2018 | Farrahi Moghaddam | ................... | |
| | | | | H02J 3/14 |
| 2018/0337769 A1* | 11/2018 | Gleichauf | ............ | G06Q 20/065 |
| 2019/0222531 A1* | 7/2019 | Lin | ....................... | H04L 43/026 |
| 2020/0166363 A1* | 5/2020 | McGavran | ............. | G07C 5/008 |
| 2020/0195495 A1* | 6/2020 | Parker | ................. | G06F 9/45558 |

OTHER PUBLICATIONS

U.S. Appl. No. 16/220,776 filed in the name of Stephen J. Todd et al. filed Dec. 14, 2018 and entitled "Dynamic Certification for Configuration Changes to Software Defined Radio Implemented Devices."

Satoshi Nakamoto, "Bitcoin: A Peer-to-Peer Electronic Cash System," http://bitcoin.org/bitcoin.pdf, 2008, 9 pages.

* cited by examiner

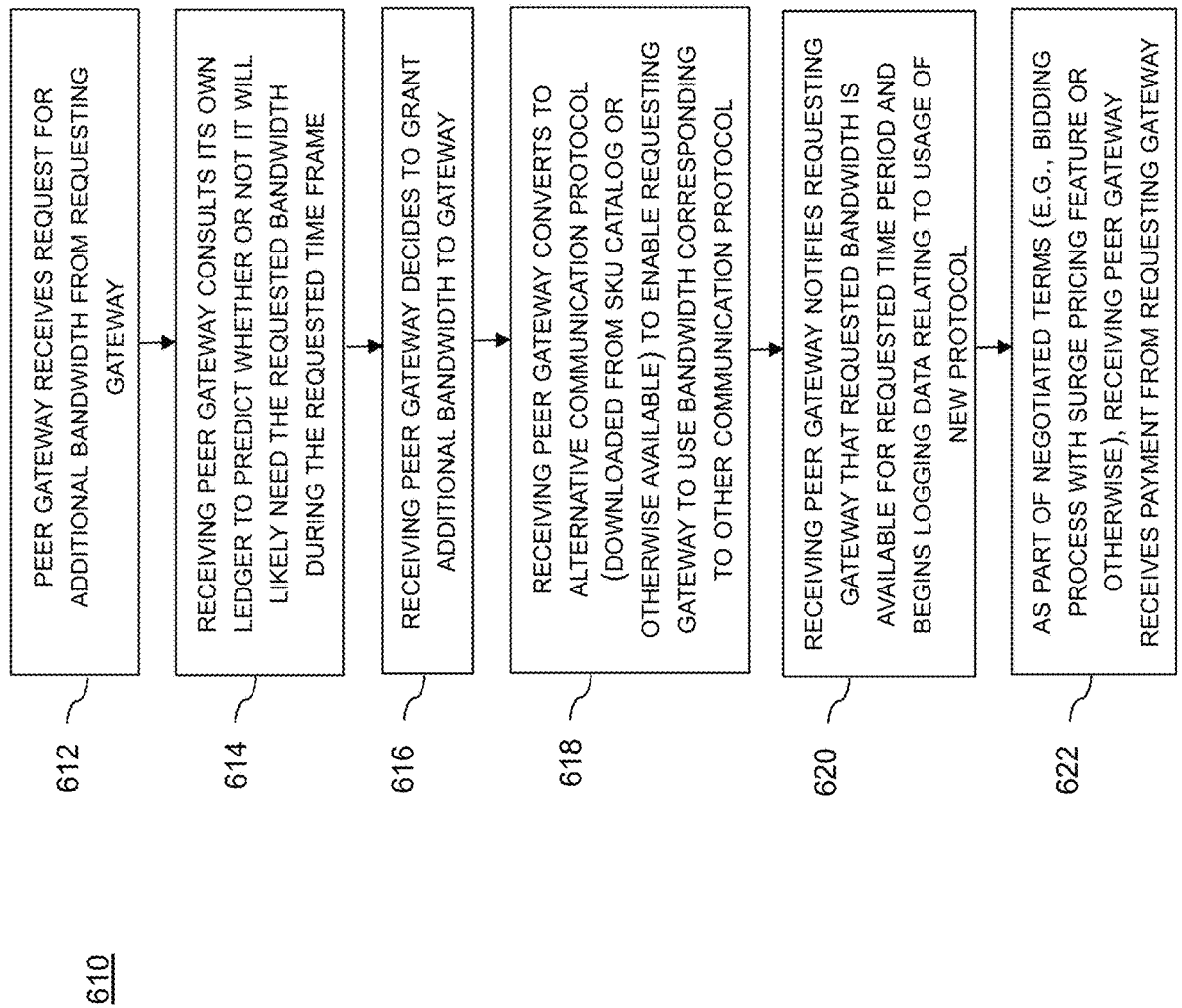

DYNAMIC GATEWAY COMMUNICATION PROTOCOL CONTROL VIA SOFTWARE DEFINED RADIO IMPLEMENTED DEVICES

FIELD

The field relates generally to communication systems and, more particularly, to communication protocol control in such communication systems.

BACKGROUND

Many technology-based enterprises have a large information technology (IT) infrastructure comprising a network of computing resources distributed across a geographic environment. These computing resources may be mobile (e.g., in a vehicle or mobile device) and/or remain at a fixed location (e.g., in stationary equipment). In some scenarios, these computing resources are part of an Internet of Things (IoT) network.

For example, a given IoT network may include sensors that monitor one or more conditions in one or more environments in which they reside by collecting data and providing data (either raw collected data and/or data processed by the sensor) to one or more computing nodes, e.g., gateways, associated with the enterprise or other entity. By way of example only, such sensors may be part of smart devices, smart cities, smart grids, connected cars, health monitors, home automation and energy management systems, and/or remote industrial process control systems, just to name a few applications. Furthermore, other devices in the IoT network that are also in communication with a gateway may include devices (e.g., programmable logic controllers) that are actuated or otherwise controlled by an enterprise or other entity through the gateway. Such devices (sensors and/or actuators) may be part of systems referred to as Industrial Control Systems (ICS) or Supervisory Control and Data Acquisition (SCADA) systems.

Typically, IoT devices are in communication with a gateway through a wireless communication protocol, e.g., cellular, Wifi, Bluetooth™, LoRaWAN™, etc. The gateways can also be in communication with computing infrastructure of an enterprise through one or more such wireless communication protocols. However, given the variety of wireless communication protocols with which gateways may communicate, signal collision and/or communication protocol bandwidth competition can occur between peer gateways.

SUMMARY

Embodiments of the invention provide techniques for dynamic communication protocol control in a communication environment.

For example, in one illustrative embodiment, a method comprises the following steps. A request is sent by a given processing node of a plurality of processing nodes to a computing system. Each of the plurality of processing nodes is operatively coupled to the computing system. Each of at least a subset of the plurality of processing nodes is configured to communicate via at least a first communication protocol with which each of the subset of the plurality of processing nodes share bandwidth. The request seeks usage of a given amount of additional bandwidth associated with the first communication protocol by the given processing node from one or more of the subset of the plurality of processing nodes.

In another illustrative embodiment, a method comprises the following steps. A request is received at a given processing node of a plurality of processing nodes from a computing system. Each of the plurality of processing nodes is operatively coupled to the computing system. Each of at least a subset of the plurality of processing nodes is configured to communicate via at least a first communication protocol with which each of the subset of the plurality of processing nodes share bandwidth. The request seeks usage of a given amount of additional bandwidth associated with the first communication protocol by a requesting one of the plurality of processing nodes. The request is then processed at the given processing node.

In a further illustrative embodiment, a system comprises a plurality of processing nodes, wherein each of the plurality of processing nodes is operatively coupled to a distributed ledger system, wherein each of the plurality of processing nodes is configured to communicate via one or more communication protocols, and wherein each of a subset of the plurality of processing nodes share bandwidth for a given one of the one or more communication protocols. The processing nodes are further configured such that: a first one of the processing nodes requests, via the distributed ledger system, usage of a given amount of additional bandwidth of the shared bandwidth associated with the given one of the one or more communication protocols from one or more of the other processing nodes; and at least one of the other processing nodes cedes at least part of its own bandwidth associated with the given one of the one or more communication protocols to the first one of the processing nodes and converts to using a second communication protocol to accommodate the request.

Advantageously, illustrative embodiments provide dynamic communication protocol control systems and methodologies wherein processing nodes (e.g., gateway peers) can negotiate that their peers temporarily use different protocols to free up more bandwidth for a given time.

These and other features and advantages of the invention will become more readily apparent from the accompanying drawings and the following detailed description.

BRIEF DESCRIPTION OF THE DRAWINGS

FIGS. 6A and 6B illustrate steps of a methodology for dynamic communication protocol control in a gateway configuration of software defined radio implemented devices in accordance with an illustrative embodiment.

DETAILED DESCRIPTION

Figure 1:
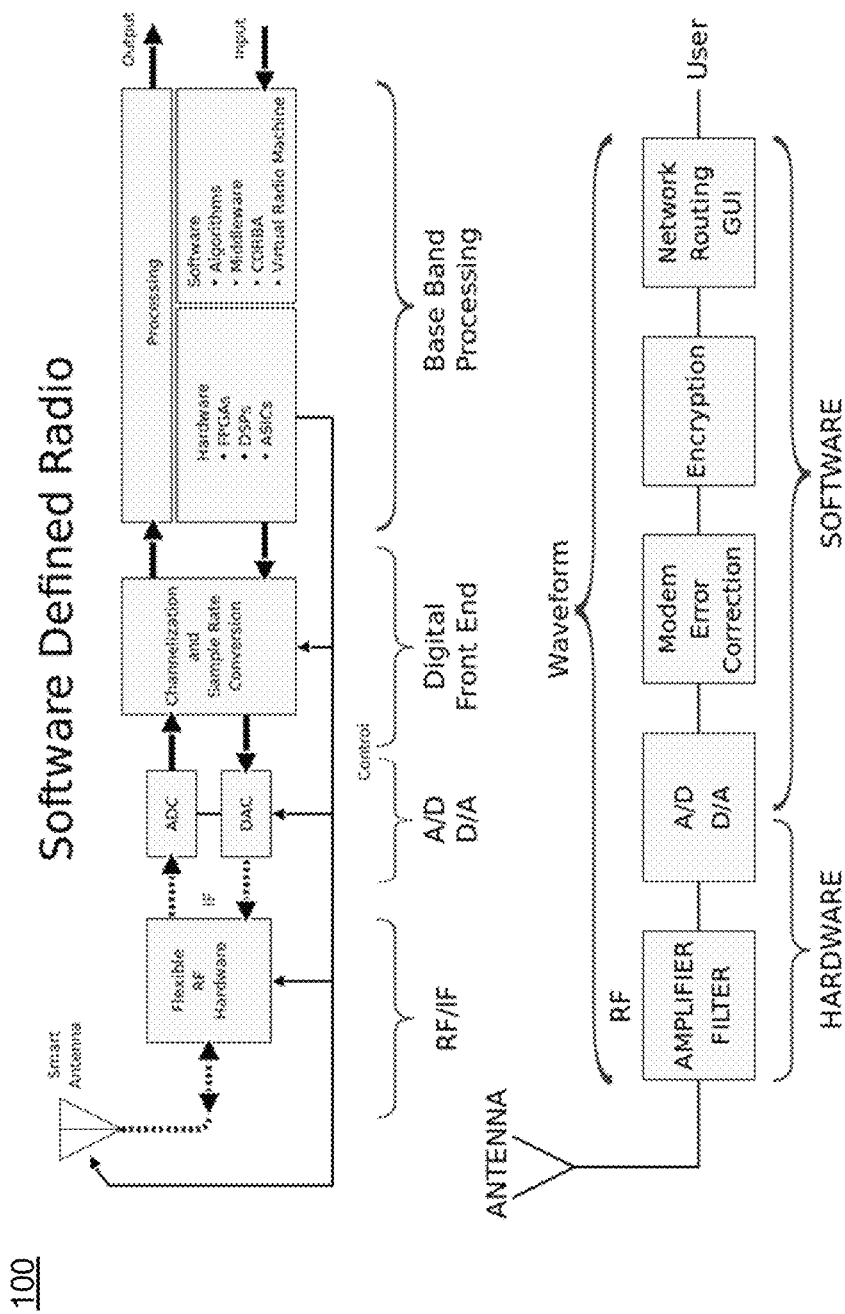
FIG. 1 illustrates an example of a software defined radio architecture with which one or more illustrative embodiments can be implemented.

Illustrative embodiments may be described herein with reference to one or more of exemplary communication systems, data processing systems, data centers, computing systems, information processing systems, as well as associated servers, computers, storage units, gateway devices and other processing devices. It is to be appreciated, however, that embodiments of the invention are not restricted to use with the particular illustrative system and device configurations shown. Moreover, the phrases "communication system," "data center," "data processing system," "computing system," "information processing system" and the like, as used herein, are intended to be broadly construed. By way of example only, while systems described herein may include cloud infrastructure as well as other types of systems comprising distributed virtual infrastructure, alternative embodiments may comprise non-cloud computing infrastructure, or combinations of cloud infrastructure and non-cloud infrastructure.

Some embodiments may comprise a cloud infrastructure hosting multiple tenants that share cloud computing resources. Such systems are considered examples of what are more generally referred to herein as cloud computing environments or platforms. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person(s) or system.

On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise use a part of IT infrastructure. However, a given embodiment may more generally comprise any arrangement of one or more processing devices.

As used herein, the term "gateway" is intended to be broadly construed. By way of example only, a gateway is a compute node or device that enables data communications between at least two discrete networks. For example, in an IoT environment, data collected from sensors is often aggregated on a gateway before being forwarded on to analytic engines on a cloud platform or other computing platform. The terms "gateway," "gateway device," "gateway node," and the like, may be used interchangeably herein. Note that, as illustratively used herein, "peer gateways" or "gateway peers," or simply "gateways" or "peers," refer to two or more gateways that are part of a "gateway configuration."

Still further, while illustrative embodiments are described herein in the context of an IoT environment, dynamic communication protocol control according to alternative embodiments may be implemented in computing environments other than IoT gateway environments, e.g., computer environments, mobile phone environments, etc. Also, dynamic communication protocol control techniques can be performed in cloud computing environments, non-cloud computing environments, or in computing environments that are a combination thereof.

As mentioned above in the background section, IoT devices are typically in communication with gateways through a wireless communication protocol; however, given the variety of wireless communication protocols with which gateways may communicate, signal collision and/or communication protocol bandwidth competition can occur between peer gateways.

Illustrative embodiments overcome this and other challenges by providing dynamic communication protocol control systems and methodologies wherein gateway peers can negotiate that their peers temporarily use different protocols to free up more bandwidth for a given time. Note that while illustrative embodiments are described herein in terms of wireless communication protocols, it is to be appreciated that alternative embodiments envision dynamic control of wired communication protocols, as well as combinations of wired and wireless communication protocols.

It is realized herein that a technology that can help address the above challenges in accordance with illustrative embodiments is software-defined radio (SDR) technology. SDR is a radio communication system where components that have been traditionally implemented in hardware are alternatively implemented via software executing on a computing platform (e.g., personal computer or embedded system). By way of example, SDR technology has been proposed to address government (e.g., Federal Communications Commission or FCC) certification of wireless gateway devices, see, e.g., the U.S. patent application identified as Ser. No. 16/220,776, filed on Dec. 14, 2018, and entitled "Dynamic Certification for Configuration Changes to Software Defined Radio Implemented Devices," the disclosure of which is incorporated by reference herein in its entirety.

FIG. 1 illustrates an example of an SDR architecture 100 with which one or more illustrative embodiments can be implemented. It is to be understood that the SDR architecture 100 is only an example of an SDR system with which embodiments may be implemented. Specific details of the software and hardware components of SDR architecture 100 (e.g., mixers, filters, amplifiers, modulators/demodulators, analog-to-digital and digital-to-analog converters, antennas, digital signal processors, middleware, algorithms, etc.) are not explicitly described herein as they are well known to those ordinarily skilled in the art.

It is realized herein that SDR technology, such as SDR architecture 100, makes it possible for a standard gateway platform to programmatically alter its connectivity capabilities (i.e., available communication protocols) on-the-fly. For example, if a gateway has been purchased with a given stock keeping unit (SKU) to communicate with sensors using cellular connectivity, a new SKU value (herein after simply "SKU") can be applied to the device that programs it to support Wifi connectivity by tuning the SDR parameters to function for that particular communication band.

Figure 2:
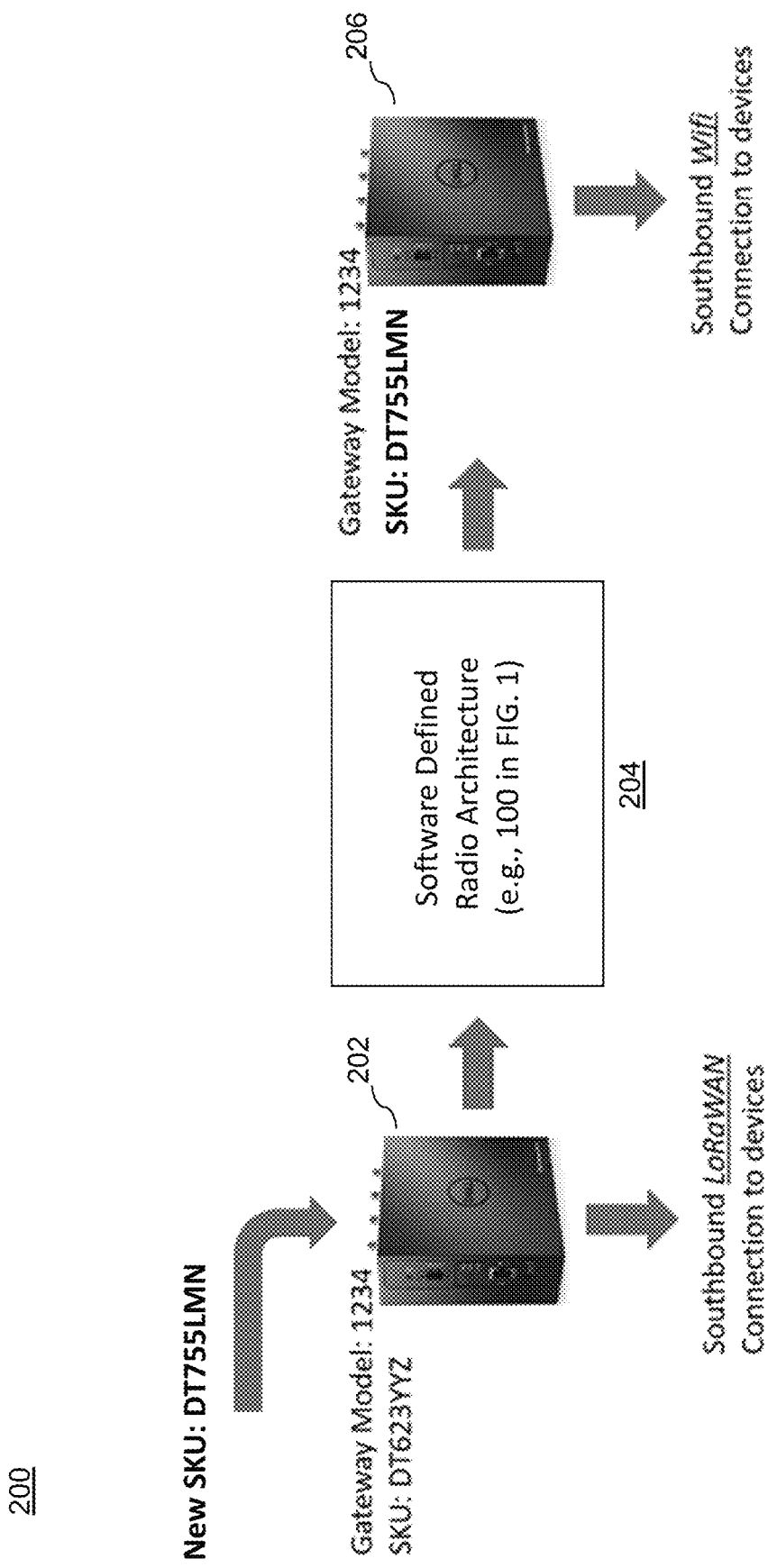
FIG. 2 illustrates an example of a process for enabling a new communication protocol via a software defined radio with which one or more illustrative embodiments can be implemented.

FIG. 2 illustrates an example 200 of a new SKU (enabling software-defined Wifi connectivity) arriving at a gateway 202 that has been previously certified using a different SKU. More particularly, in this example, assume that gateway 202 (model 1234) is currently deployed and communicating southbound via LoRaWAN™ connectivity. It is to be understand that the term "southbound" and the corresponding term "northbound" refer to a particular direction of connectivity with respect to the gateway. Typically, "northbound" refers to connectivity between the gateway and another computing platform that uses the IoT data collected by the gateway, e.g., a cloud computing platform, analytic platform, or some other platform associated with an enterprise or entity. "Southbound" refers to connectivity between the gateway and the sensors and/or actuators that comprise the IoT environment. It is assumed that gateway 202 is configured for LoRaWAN™ southbound functionality based on a first SKU (DT623YYZ). Assume that a new SKU (DT755LMN) then arrives at the gateway 202, and the gateway 202 uses programmability techniques of an SDR architecture 204 resident in the gateway (e.g., similar to the SDR architecture 100 in FIG. 1) to enable southbound Wifi functionality on the gateway. The reprogrammed gateway is referred to as gateway 206.

It is to be appreciated that while FIG. 2 highlights gateways and other devices (e.g., sensors), challenges described herein apply to other types of configurations (e.g., mobile devices, cell phones, etc.).

Figure 3:
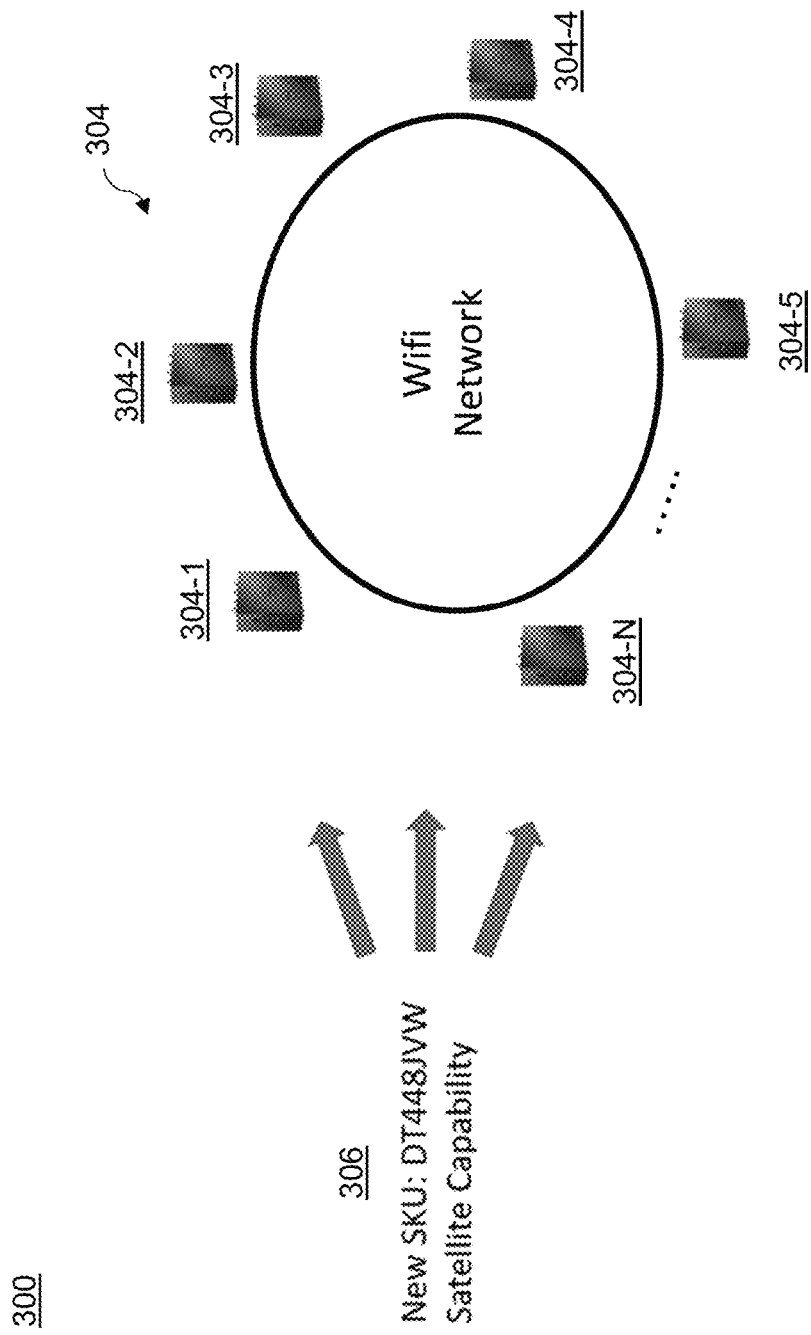
FIG. 3 illustrates a system for dynamically adding satellite communication capability to a network of software defined radio implemented devices forming a gateway configuration in accordance with an illustrative embodiment.

FIG. 3 illustrates a system 300 for dynamically adding satellite communication capability to a network of software defined radio implemented devices forming a gateway configuration in accordance with an illustrative embodiment. More particularly, FIG. 3 highlights a gateway configuration 304 where N peer gateways 304-1, 304-2, 304-3, 304-4, 304-5, . . . , 304-N are currently sharing a limited-bandwidth Wifi network. Further, as shown, a new SKU (DT448JVW) 306 is applied to the peer gateways 304-1, 304-2, 304-3, 304-4, 304-5, . . . , 304-N. The new SKU 306 received by each gateway enables reconfiguration of the gateway, through SDR techniques, to be able to communicate over a satellite link and/or the Wifi network. Should the Wifi network become overly congested (i.e., insufficient available bandwidth for one or more of the gateways to communicate with their corresponding IoT devices), it would be advantageous for one or more gateways to cease using the Wifi connection and shift over to a satellite connection. This capability can be especially helpful if a given gateway needs to access a larger portion of the available Wifi bandwidth for a given time period.

However, there are a number of challenges to providing such communication protocol conversion functionality. Some of these challenges will now be described.

Different Wifi protocols each have theoretical and actual (practical) maximum bit rates (speeds in terms of Megabits per second or Mbps). Note that "speed" typically refers to a bit rate of given communication circuitry while "bandwidth" is the amount of speed available for use. Nonetheless, for purposes of the illustrative description, the terms speed and bandwidth may be used interchangeably herein. The table below highlights theoretical and actual (practical) bandwidths for different Institute of Electrical and Electronics Engineers (IEEE) Wifi protocols:

| Protocol | Theoretical | Actual |
| --- | --- | --- |
| 802.11b | 11 Mbps | 5.5 Mbps |
| 802.11a | 54 Mbps | 20 Mbps |
| 802.11g | 54 Mbps | 20 Mbps |
| 802.11n | 600 Mbps | 100 Mbps |
| 802.11ac | 1,300 Mbps | 200 Mbps |

Figure 4:
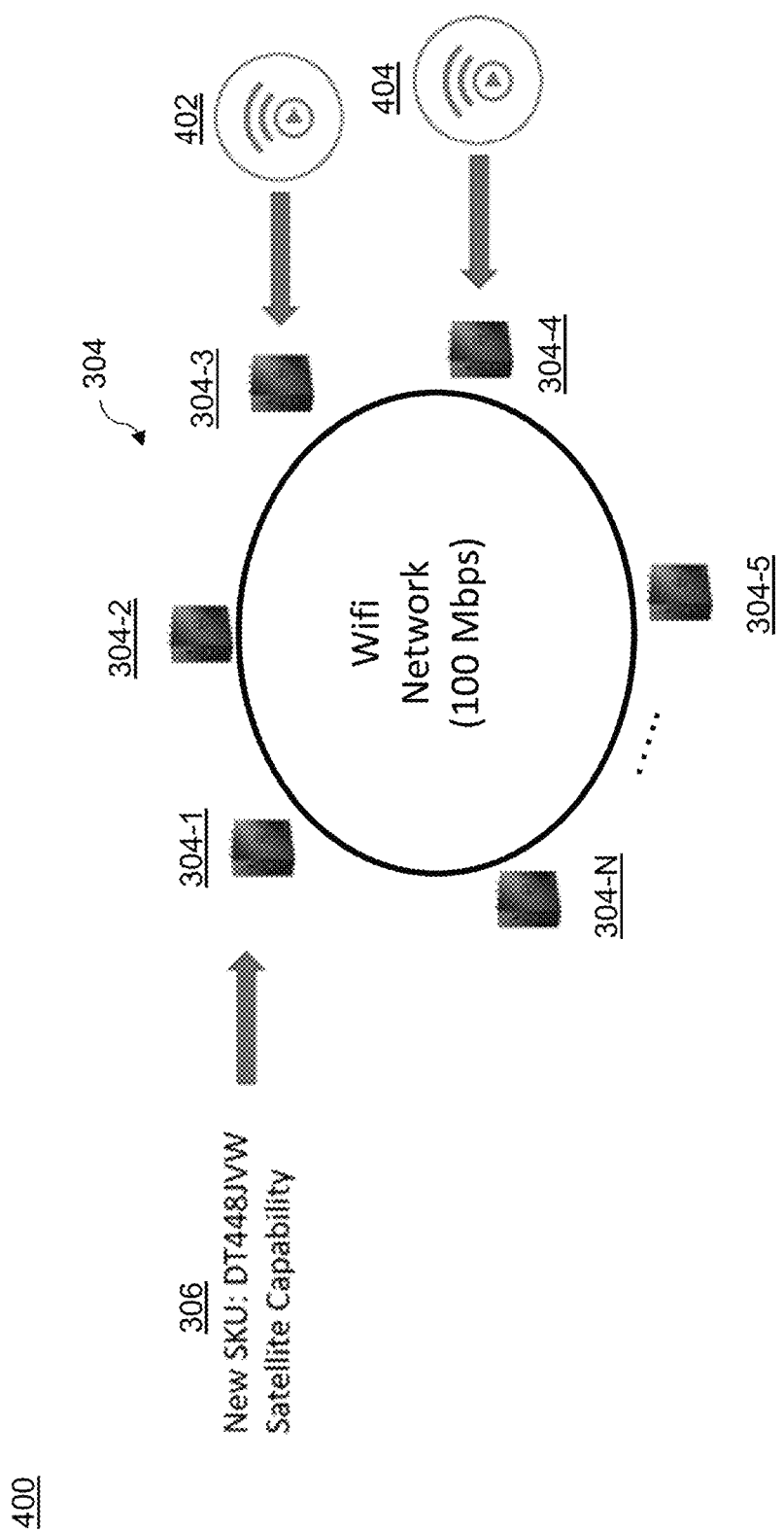
FIG. 4 illustrates a scenario illustrating insufficient bandwidth in the gateway configuration of FIG. 3.

Consider a gateway configuration where the maximum actual available Wifi network bandwidth of 100 Mbps is being shared by multiple gateways that are only capable of using Wifi, and one or more of the gateways that each have a critical need to begin streaming video. FIG. 4 illustrates this scenario using the gateway configuration of FIG. 3.

In system 400 of FIG. 4, gateways 304-3 and 304-4 recognize that their streaming needs (due to the input of video 402 to gateway 304-3 and video 404 to gateway 304-4) will more than exceed their fair share of the available Wifi bandwidth. In some embodiments, "fair share" may refer to a pre-allocated amount of bandwidth. Assume, however, that gateway 304-1 would be willing to temporarily shift over to a different communication protocol, and is capable of doing so by downloading new SKU 306 and programming its corresponding SDR to communicate via satellite instead of Wifi (e.g., as mentioned above in the context of FIG. 3). Note that any of the gateways 304-1, 304-2, 304-3, 304-4, 304-5, . . . , 304-N may not need to download a new SKU because they already have the satellite capability. However, with existing systems, the scenario described in FIG. 4 is currently not possible for a number of reasons outlined below.

Lack of configuration awareness. In FIG. 4, each gateway is typically unaware of the number of other gateways that are currently using a given protocol, i.e., not aware of the other gateways in the given gateway configuration.

Lack of awareness of aggregate bandwidth. In addition to being unaware of the number of gateways currently using a given communication protocol, there is no ability to know the aggregate bandwidth that is available and/or being used by those gateway devices.

Inability to advertise the need for more bandwidth. There is no current mechanism for one or more gateways to negotiate with other gateways to take a larger share of available bandwidth for a given time period.

Lack of predictability. Peer gateways may be hesitant to relinquish their bandwidth given the fact that they have no ability to predict their own potential usage in the short term.

Lack of incentive. Should a peer gateway decide to temporarily relinquish one protocol (e.g., Wifi) and adopt another (e.g., satellite), there is no incentive for the gateway to do so (unless perhaps the gateway is part of a homogenous corporate installation).

No catalog of alternative protocols. If a given gateway wishes to limit its usage of a given protocol to benefit a peer, there is no catalog of available alternatives that a gateway can consider.

Illustrative embodiments overcome the above and other challenges by providing dynamic communication protocol control systems and methodologies wherein gateway peers can negotiate that their peers temporarily use different protocols to free up more bandwidth for a given time. For example, in one or more embodiments, distributed ledger technology and smart contract technology are leveraged to create the dynamic capability for any given gateway to adjust its connectivity based on the needs of its peers.

Figure 5:
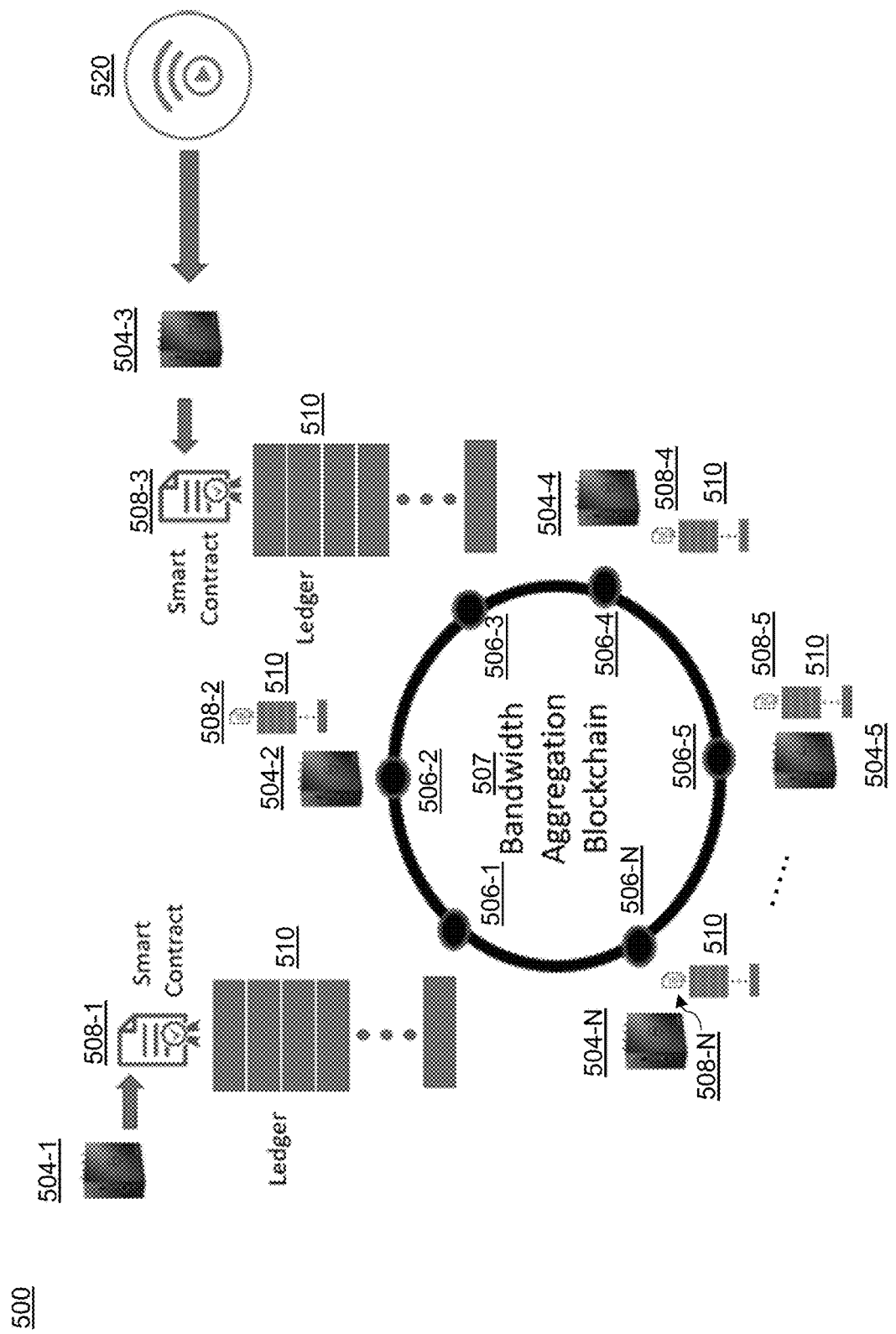
FIG. 5 illustrates a system for dynamic communication protocol control in a gateway configuration of software defined radio implemented devices in accordance with an illustrative embodiment.

FIG. 5 illustrates a system 500 for dynamic communication protocol control in a gateway configuration of software defined radio (SDR) implemented devices in accordance with an illustrative embodiment. As shown, gateways 504-1, 504-2, 504-3, 504-4, 504-5, . . . , 504-N are respectively associated with compute nodes 506-1, 506-2, 506-3, 506-4, 506-5, . . . , 506-N of a bandwidth aggregation blockchain system 507. Further, gateways 504-1, 504-2, 504-3, 504-4, 504-5, . . . , 504-N respectively interact with the compute nodes 506-1, 506-2, 506-3, 506-4, 506-5, . . . , 506-N through smart contract modules 508-1, 508-2, 508-3, 508-4, 508-5, . . . , 508-N. Each one of gateways 504-1, 504-2, 504-3, 504-4, 504-5, . . . , 504-N, as will be explained further below, has access to the same distributed ledger 510 that is managed through the blockchain system 507.

Note that when referenced singularly, a given one of gateways 504-1, 504-2, 504-3, 504-4, 504-5, . . . , 504-N may be referred to below as gateway 504, a given one of compute nodes 506-1, 506-2, 506-3, 506-4, 506-5, . . . , 506-N as compute node 506, and a given one of smart contract modules 508-1, 508-2, 508-3, 508-4, 508-5, . . . , 508-N as smart contract module 508. Furthermore, while FIG. 5 depicts a compute node 506 of the blockchain system 507 separate from a gateway 504, it is to be appreciated that, in some embodiments, compute node 506 may be part of gateway 504 or vice versa. Still further, each smart contract module 508 may reside on gateway 504, compute node 506, or a combination of both. A "processing node," in some embodiments, may collectively refer to a gateway 504, a compute node 506 and a smart contract module 508, or some combination thereof.

Before further describing various aspects and advantages of system 500, a brief description of blockchain technology will first be provided.

As used herein, the terms "blockchain," "distributed ledger" and "digital ledger" may be used interchangeably. A blockchain or digital ledger protocol is implemented via a distributed, decentralized computer network of computing resources or nodes (e.g., compute nodes 506-1, 506-2, 506-3, 506-4, 506-5, . . . , 506-N). The compute nodes are operatively coupled in a peer-to-peer communications protocol. In the computer network, each compute node is configured to maintain a blockchain (e.g., distributed ledger 510) which is a cryptographically secured record or ledger of data blocks that represent respective transactions within a given computational environment (e.g., transactions are events associated with dynamic communication protocol control according to illustrative embodiments). The blockchain is secured through use of a cryptographic hash function. A cryptographic hash function is a cryptographic function which takes an input (or message) and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In existing digital ledger technologies such as blockchain, an underlying consensus algorithm is typically used to validate new transactions before they are added to the digital ledger. Typically, for example, the new transaction entry is broadcast to all or a subset of nodes within the network and inspected. The entry is formally committed to the blockchain when consensus is reached by the recipient nodes that the entry is valid.

The blockchain distributed ledger may be a "bitcoin" type implementation. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the network (or any other node or party). For this reason, a cryptographic hash function is used. Each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work."

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Bitcoins or other cryptocurrencies exchanged between compute nodes are typically stored by the compute node in one or more electronic wallets. Such an electronic wallet is configured to maintain or otherwise manage cryptocurrency received by and sent from a given compute node. The electronic wallet can be part of the compute node, another separate node, or some combination thereof.

A smart contract is a self-executing agreement with the terms of the agreement between contracting parties (e.g., between gateways 504-1, 504-2, 504-3, 504-4, 504-5, . . . , 504-N) being directly written into lines of software program code. In illustrative embodiments, the code and the term agreements contained therein exist across a blockchain system (e.g., 507).

Given the illustrative architecture of system 500, some key features and advantages of the system include the following:

(i) When a given gateway 504 joins the bandwidth aggregation blockchain system 507 via an associated compute node 506, the given gateway 504 is notified by its associated compute node 506 of other peer gateways that are part of the system 507. Likewise, existing peer gateways of the system 507 are notified of the newly joined gateway 504.

(ii) Historical usage per gateway 504 is logged in the distributed ledger 510.

(iii) Each gateway 504 requests to consume additional bandwidth (of whatever communication protocol(s) the plurality of gateways share) are made via smart contract module 508.

(iv) Dynamic communication protocol modification (e.g., conversion of the SDR from use of one communication protocol to use of another communication protocol) in response to a bandwidth request (or modification if that capability is already present).

(v) A catalog of available SKUs for different communication protocols is accessible on the distributed ledger 510 as part of one or more stored transactions or accessible from some other source.

(vi) Downloads and deployment of new SKUs are registered on the blockchain system 507.

(vii) Agreements between gateways to cede bandwidth are registered on the blockchain system 507 (with potential cryptocurrency transfer).

The above and other features and advantages of the dynamic communication protocol control techniques according to illustrative embodiments will be further described below.

Gateways that wish to participate in dynamic bandwidth control (or more generally referred to as dynamic communication protocol control) register themselves as part of bandwidth aggregation blockchain system 507. This gives each gateway access to smart contracts (via module 508) as well as the ability to query the distributed ledger 510.

As each gateway 504 now has access to the distributed ledger 510, each gateway can begin logging its historical usage of its communication protocols. Non-limiting examples of the logged information include: (i) what communication protocol(s) the gateway is currently using; (ii) how much data is being transferred over each protocol; (iii) time-based histograms of usage (per protocol); and (iv) historical uptime/QoS (quality-of-service).

Advantageously, from this logged information, the average and maximum bandwidth numbers for the entire set of peer gateways can now be accessed from the ledger 510. Further, time-based patterns of usage help each individual gateway know when they are busy or idle (or likely to be) for any given protocol. Peer gateways can also access this information and directly negotiate with gateways that may appear to be idle in a given time frame. Historical uptime/QoS allows gateways to obtain ratings on how well the gateway performs. This can lead to a higher payment (cryptocurrency transfer) if a gateway bids for services.

Figure 6A:
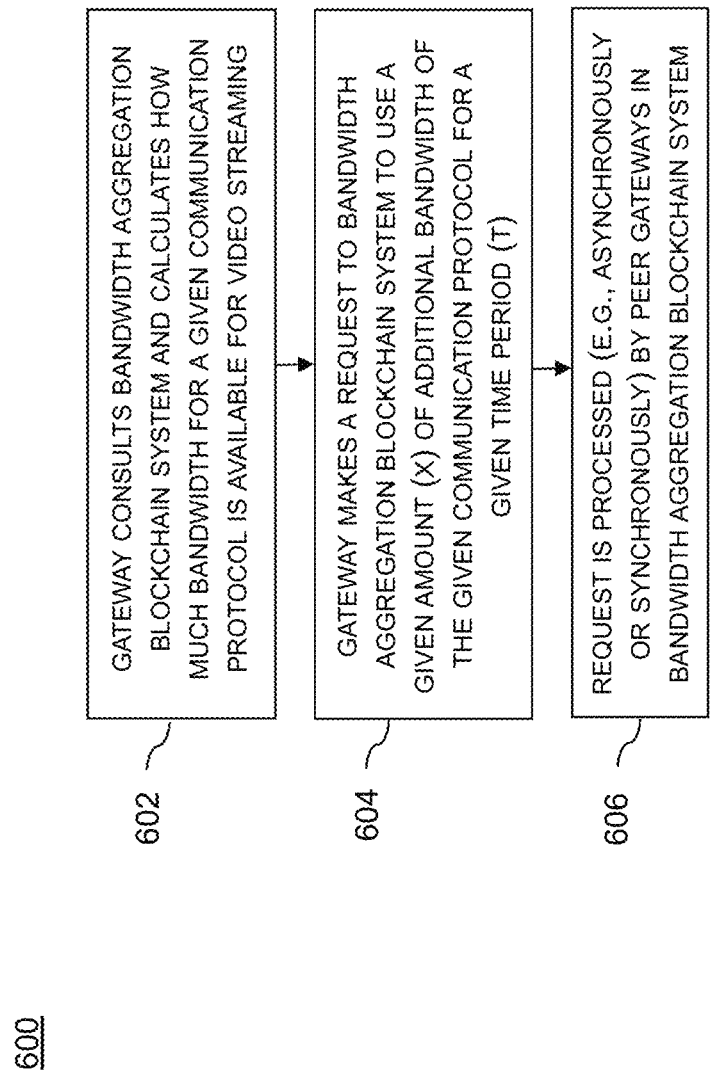

If a given gateway 504 (e.g., gateway 504-3 streaming video 520 in FIG. 5) has a critical need to consume more than its fair share of available bandwidth, steps depicted in a method 600 of FIG. 6A are taken:

Step 602: Gateway 504-3 consults the bandwidth aggregation blockchain system 507 and calculates how much bandwidth for a given communication protocol is likely available for video streaming.

Step 604: Gateway 504-3 makes a request to the bandwidth aggregation blockchain system 507 to use X amount of additional bandwidth of the given communication protocol for time period T.

Step 606: The request is processed by peer gateways in bandwidth aggregation blockchain system 507. This request can be handled in one of several ways, for example:

Asynchronously: the request is inspected by the peer gateways in the blockchain system 507, confirmed for its validity, and entered into the distributed ledger 510 as a transaction.

Synchronously: successful validation of the request results in a granting of permission to claim the extra bandwidth; this may also involve the exchange of cryptocurrency with peer gateways that agree to stop using bandwidth, as will be further described below.

Once a request is made by a gateway (e.g., 504-3) to consume additional bandwidth, a receiving peer gateway (one of 504-1, 504-2, 504-4, 504-5, . . . , 504-N) can determine whether or not they want to participate in the bandwidth sharing request. One illustrative embodiment of how this may occur is depicted in method 610 of FIG. 6B (note that while the steps below refer to one peer gateway, it is understood that each peer gateway may process a request in a similar manner):

Step 612: A peer gateway receives (i.e., receiving peer gateway) the request for additional bandwidth from video streaming gateway 504-3 (requesting gateway).

Step 614: The receiving peer gateway consults its own ledger (510) to predict whether or not it will likely need that bandwidth during the requested time frame (recall the logged information described above). The request can be rejected if the receiving peer gateway does not wish for gateway 504-3 to use that bandwidth during that time.

Step 616: If the receiving peer gateway does wish to grant additional bandwidth to gateway 504-3, it can choose to immediately validate the request (see asynchronous processing step 606 above), or it may choose to validate the request and also sign up for bandwidth throttling or cessation during that time period.

Step 618: Assuming the receiving peer gateway does wish to grant additional bandwidth to gateway 504-3, the receiving peer gateway uses SDR techniques (described above) to switch to a new communication protocol (e.g., from Wifi to satellite).

Step 620: The receiving peer gateway then creates a request of its own that is shared as a transaction on the blockchain system 507 to note the fact that it has switched to a new communication protocol during that time period and thus notify gateway 504-3 that the requested (Wifi) bandwidth is available for the requested time period.

If the receiving peer gateway does not have an alternative communication protocol, it consults a list of available protocols. For example, the receiving peer gateway can consult a list of available SKUs for different protocols (e.g., satellite, LoWaRan™, cellular, etc.) that can be downloaded and certified (as part of step 618). In some embodiments, the SKU catalog can be located at an external storage location (e.g., a cloud) or, in other embodiments, it can be found within the blockchain system 507 itself (e.g., transaction data accessible from distributed ledger 510). When a gateway downloads a new SKU, and undergoes the install and certification, it can then notify the blockchain system 507 (part of step 618) that it is no longer consuming the requested bandwidth. The gateway then begins logging how often it uses this new protocol as part of the technique as described above.

Step 622: Calling smart contracts (via a smart contract module 508) allows a dynamic gateway to receive payment for ceding its usage of a particular protocol. The smart contract(s) can transfer cryptocurrency upon initial validation of the request, or if the gateway changes its protocol asynchronously it can register its usage of the protocol and receive cryptocurrencies after the fact.

In one or more embodiments, gateways compete through a bidding process conducted over the distributed ledger 510 (and managed by the smart contract modules) for the right to use a different protocol and receive cryptocurrency payments (via step 622). The gateways with the (provably) historical "best" QoS may stand a chance of winning the bid. In some embodiments, gateways participate in "surge pricing" (e.g., similar to ride sharing) in that prices go up for any given pool of gateways that are already fairly saturated in terms of bandwidth consumption.

Figure 7:
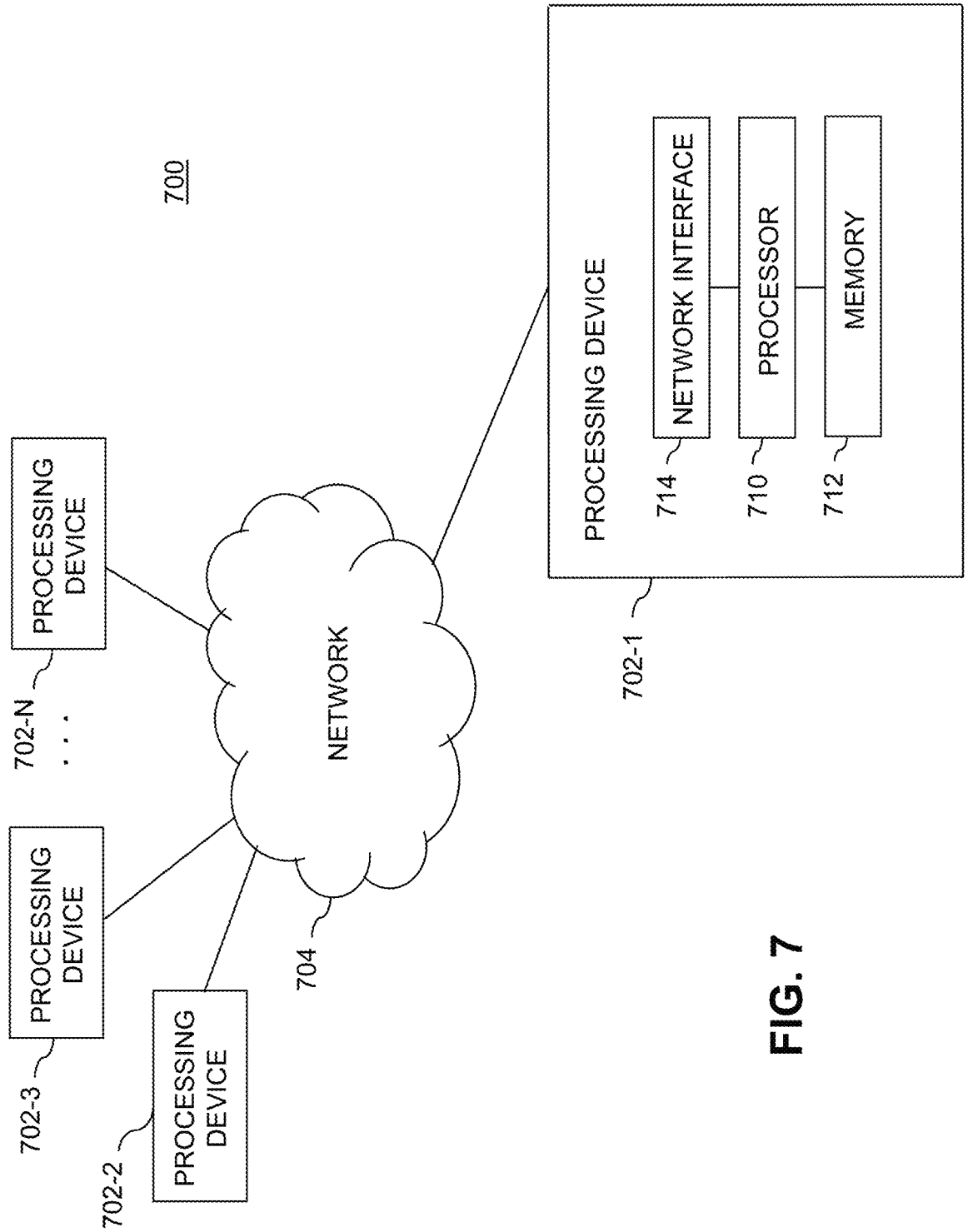
FIG. 7 illustrates a processing platform used to implement a system for dynamic communication protocol control in a gateway configuration of software defined radio implemented devices according to an illustrative embodiment of the invention.

As an example of a processing platform on which a dynamic communication protocol control system (as shown in FIGS. 1-6B) according to illustrative embodiments can be implemented is processing platform 700 shown in FIG. 7. The processing platform 700 in this embodiment comprises a plurality of processing devices, denoted 702-1, 702-2, 702-3, . . . , 702-N (singularly referred to below as 702), which communicate with one another over a network 704. It is to be appreciated that methodologies described herein may be executed in one such processing device 702, or executed in a distributed manner across two or more such processing devices 702. Thus, the dynamic communication protocol control system may be executed in a distributed manner across two or more such processing devices 702. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 7, such a device comprises at least one processor and an associated memory, and implements one or more functional modules for instantiating and/or controlling features of systems and methodologies described herein. Multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random-access memory (RAM), read-only memory (ROM) or other types of memory, in any combination. The one or more software programs when executed by a processing device, such as the processing device 702-1, causes the device to perform functions associated with one or more of the components/steps of system/methodologies in FIGS. 1-6B. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the network 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for processing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the dynamic communication protocol control system described herein may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the dynamic communication protocol control system may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
sending a request by a given processing node of a plurality of processing nodes to a computing system, wherein each of the plurality of processing nodes is operatively coupled to the computing system, wherein each of at least a subset of the plurality of processing nodes is configured to communicate via at least a first communication protocol with which each of the subset of the plurality of processing nodes share bandwidth, and wherein the request seeks usage of a given amount of additional bandwidth associated with the first communication protocol by the given processing node from one or more of the subset of the plurality of processing nodes; and obtaining, by the given processing node, in response to a decision by the one or more of the subset of the plurality of processing nodes receiving the request to grant the request, access to the at least a portion of the given amount of the additional bandwidth associated with the first communication protocol and ceded by the one or more of the subset of the plurality of processing nodes in accordance with the decision to grant the request;

wherein the given processing node, prior to sending the request, consults the computing system to determine an amount of available bandwidth associated with the first communication protocol; and wherein the steps are performed by at least one processor and a memory associated with the given processing node.

2. The method of claim 1, wherein the request further comprises a given time period for which the additional bandwidth is sought.

3. The method of claim 1, wherein the computing system is a blockchain system.

4. The method of claim 3, wherein each of the plurality of processing nodes has access to a common distributed ledger of transaction data maintained in accordance with the blockchain system.

5. The method of claim 4, wherein access to the common distributed ledger is at least partially via a smart contract module.

6. The method of claim 4, wherein the request is part of the transaction data maintained in accordance with the blockchain system.

7. The method of claim 1, wherein the plurality of processing nodes are a plurality of gateways and the first communication protocol is a wireless communication protocol with which each of at least a subset of the plurality of gateways receives data and/or transmits data.

8. The method of claim 7, wherein each of the plurality of gateways comprises a software defined radio architecture that is programmatically configurable through one or more configuration parameters to support different communication protocols.

9. The method of claim 1, wherein the step of obtaining further comprises the given processing node:

negotiating with receiving processing nodes of the one or more of the subset of the plurality of processing nodes; and selecting, based on one or more parameters, at least one of the receiving processing nodes from which the at least a portion of the given amount of the additional bandwidth is to be received.

10. A system, comprising:

a plurality of processing nodes, wherein each of the plurality of processing nodes is operatively coupled to a distributed ledger system, wherein each of the plurality of processing nodes is configured to communicate via one or more communication protocols, and wherein each of at least a subset of the plurality of processing nodes share bandwidth for a given one of the one or more communication protocols;

wherein the processing nodes are further configured such that:

a first one of the processing nodes requests, via the distributed ledger system, usage of a given amount of additional bandwidth of the shared bandwidth associated with the given one of the one or more communication protocols from one or more of the other processing nodes; and in response to the request, at least one of the other processing nodes:

decides to grant the request to the first one of the processing nodes for at least part of its own bandwidth associated with the given one of the one or more communication protocols;

cedes the at least part of its own bandwidth associated with the given one of the one or more communication protocols to the first one of the processing nodes; and converts to using a second communication protocol to accommodate the request;

wherein each of the processing nodes comprises a processor operatively coupled to a memory.

11. The system of claim 10, wherein ceding the at least part of its own bandwidth comprises the at least one of the other processing nodes discontinuing use of the portion of the at least part of its own bandwidth associated with the given one of the one or more communication protocols.

12. The system of claim 10, further comprising the at least one of the other processing nodes receiving a negotiated payment from the first one of the processing nodes for the granting of the request.

13. A method comprising:

receiving a request at a given processing node of a plurality of processing nodes from a computing system, wherein each of the plurality of processing nodes is operatively coupled to the computing system, wherein each of at least a subset of the plurality of processing nodes is configured to communicate via at least a first communication protocol with which each of the subset of the plurality of processing nodes share bandwidth, and wherein the request seeks usage of a given amount of additional bandwidth associated with the first communication protocol by a requesting one of the plurality of processing nodes;

processing the request at the given processing node; and determining by the given processing node whether to grant the request to the requesting one of the plurality of processing nodes for at least a portion of the given amount of the additional bandwidth associated with the first communication protocol;

wherein the given processing node:

decides to grant the request; and performs one of bandwidth throttling and cessation of use of the portion of the given amount of the additional bandwidth for a given time period for which the additional bandwidth is sought; and wherein the steps are performed by at least one processor and a memory associated with the given processing node.

14. The method of claim 13, wherein the step of processing the request further comprises:

the given processing node determining its own need for the requested additional bandwidth.

15. The method of claim 14, wherein the step of processing the request further comprises the given processing node converting from using the first communication protocol to using a second communication protocol to accommodate the request.

16. The method of claim 15, wherein the second communication protocol comprises a communication protocol that the given processing node already supports concurrent with the first communication protocol.

17. The method of claim 15, wherein the second communication protocol comprises a communication protocol that the given processing node does not already support.

18. The method of claim 17, wherein the step of processing the request further comprises the given processing node obtaining a value that enables dynamic reconfiguration of the given processing node to support the second communication protocol.

19. The method of claim 15, wherein the step of processing the request further comprises the given processing node notifying the requesting processing node, via the computing system, of the granting of the request.

20. The method of claim 19, wherein the step of processing the request further comprises the given processing node receiving a negotiated payment from the requesting processing node for the granting of the request.

* * * * *